US010343746B2

(12) United States Patent
Doerndorfer

(10) Patent No.: US 10,343,746 B2
(45) Date of Patent: Jul. 9, 2019

(54) DRIVE ASSEMBLY FOR A MANUALLY DRIVEN VEHICLE WITH AN ELECTRIC AUXILIARY DRIVE, METHOD FOR REGULATING A DRIVE ASSEMBLY OF THIS TYPE, AND USE

(71) Applicant: Unicorn Energy GmbH, Schwaebisch Gmuend (DE)

(72) Inventor: Johannes Doerndorfer, Schwaebisch Gmuend (DE)

(73) Assignee: Unicorn Energy GmbH, Schwaebisch Gmuend (DE)

( * ) Notice: Subject to any disclaimer, the term of this patent is extended or adjusted under 35 U.S.C. 154(b) by 103 days.

(21) Appl. No.: 15/544,559

(22) PCT Filed: Dec. 15, 2015

(86) PCT No.: PCT/EP2015/079831
§ 371 (c)(1),
(2) Date: Jul. 19, 2017

(87) PCT Pub. No.: WO2016/116226
PCT Pub. Date: Jul. 28, 2016

(65) Prior Publication Data
US 2018/0015985 A1 Jan. 18, 2018

(30) Foreign Application Priority Data

Jan. 19, 2015 (DE) .................. 10 2015 100 676

(51) Int. Cl.
*B62M 23/00* (2006.01)
*F16H 49/00* (2006.01)
(Continued)

(52) U.S. Cl.
CPC .............. *B62M 6/50* (2013.01); *B62M 6/45* (2013.01); *B62M 6/55* (2013.01); *B62M 23/00* (2013.01);
(Continued)

(58) Field of Classification Search
CPC . B62M 6/50; B62M 6/55; B62M 6/66; B62M 6/45; B62M 23/00; B62M 23/02; F16H 49/001
See application file for complete search history.

(56) References Cited

U.S. PATENT DOCUMENTS 6,152,249 A 11/2000 Li et al.
8,256,554 B2 * 9/2012 Chan ................... B62M 6/55
180/206.4
(Continued)

FOREIGN PATENT DOCUMENTS

CN 102442397 A 5/2012
CN 202 449 162 U 9/2012
(Continued)

OTHER PUBLICATIONS

International Search Report, International Application No. PCT/EP2015/079831, pp. 1-3, International Filing Date Dec. 15, 2015, dated Feb. 19, 2016.

*Primary Examiner* — Tony H Winner
(74) *Attorney, Agent, or Firm* — Bond Schoeneck & King, PLLC; George McGuire

(57) ABSTRACT

The present invention relates to a drive assembly (10) for a manually driven vehicle (80), in particular a bicycle or a pedelec, with an electric auxiliary drive (24), wherein the drive assembly (10) has a first drive shaft (12) for a manual drive and a rotor (20) of the electric auxiliary drive (24), and wherein the first drive shaft (12) and the rotor (20) of the electric auxiliary drive (24) are coupled to a common drive element (29), wherein the first drive shaft (12) and the rotor
(Continued)

(20) of the electric auxiliary drive (24) are coupled to the drive element (29) by means of a harmonic drive (25), wherein the harmonic drive (25) has an outer sleeve (28) with an internal toothing system (62) and a deformable inner sleeve (26) with an external toothing system (64) and a shaft generator (27), wherein the shaft generator (27) is at least indirectly connected fixedly to the rotor (20) of the electric auxiliary drive (24) so as to rotate with it, wherein the deformable inner sleeve (26) is at least indirectly connected fixedly to the first drive shaft (12).

19 Claims, 10 Drawing Sheets

(51) Int. Cl.
  *B62M 6/50* (2010.01)
  *B62M 6/45* (2010.01)
  *B62M 6/55* (2010.01)
(52) U.S. Cl.
  CPC ........ *F16H 49/001* (2013.01); *Y02T 10/7258* (2013.01)

(56) References Cited

U.S. PATENT DOCUMENTS

| | | | |
|---|---|---|---|
| 8,646,560 B2* | 2/2014 | Chan | B62M 6/50 180/206.3 |
| 8,919,478 B2* | 12/2014 | Gao | B62M 6/55 180/206.4 |
| 9,377,326 B2* | 6/2016 | Huang | B62M 6/50 |
| 2008/0254929 A1* | 10/2008 | Wesling | B62M 9/16 475/182 |
| 2012/0046140 A1* | 2/2012 | Shelef | F16H 49/001 475/182 |
| 2013/0006463 A1 | 1/2013 | Yang et al. | |
| 2013/0162112 A1* | 6/2013 | Loefel | B62M 6/55 310/68 B |
| 2013/0276575 A1* | 10/2013 | Hoebel | B62M 6/55 74/640 |
| 2015/0247563 A1* | 9/2015 | Yeh | F16H 49/001 74/457 |
| 2016/0245386 A1* | 8/2016 | Rossberger | F16H 49/001 |

FOREIGN PATENT DOCUMENTS

| | | |
|---|---|---|
| CN | 103129691 A | 6/2013 |
| CN | 103228951 A | 7/2013 |
| DE | 102010037183 A1 | 3/2012 |
| DE | 202013105070 U1 | 11/2013 |
| DE | 102013003108 A1 | 8/2014 |
| EP | 2724925 A1 | 4/2014 |
| EP | 2783969 A1 | 10/2014 |
| EP | 2829466 A1 | 1/2015 |
| EP | 2878526 A1 | 6/2015 |
| JP | 2000 168672 A | 12/2001 |
| WO | 2012046216 A2 | 4/2012 |

* cited by examiner

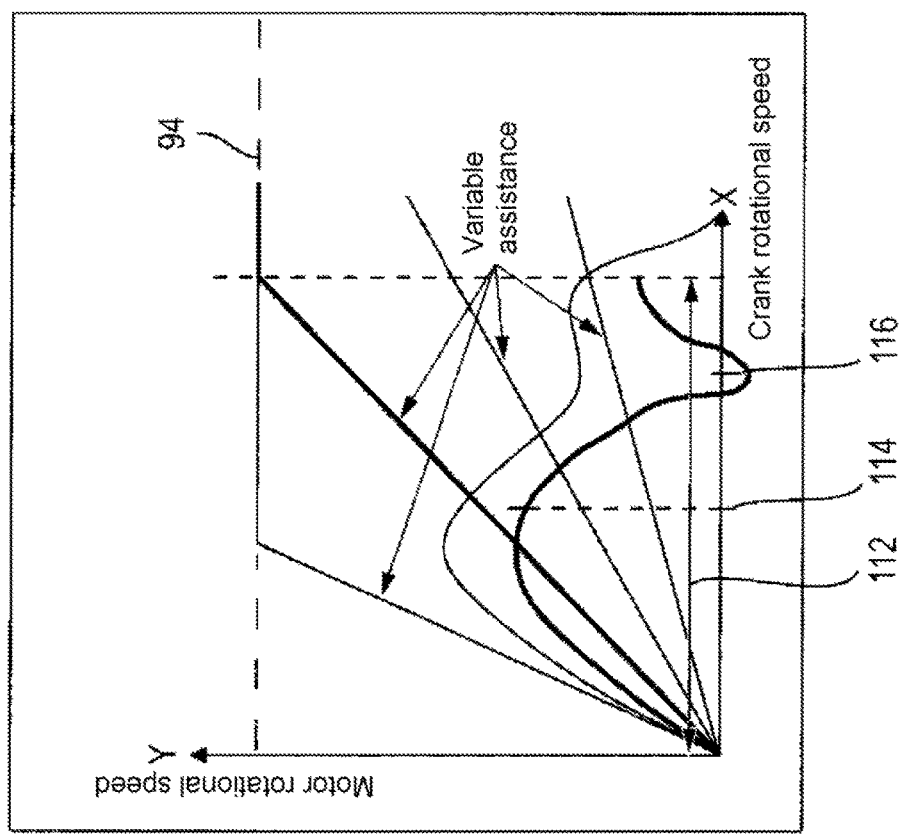

DRIVE ASSEMBLY FOR A MANUALLY DRIVEN VEHICLE WITH AN ELECTRIC AUXILIARY DRIVE, METHOD FOR REGULATING A DRIVE ASSEMBLY OF THIS TYPE, AND USE

CROSS-REFERENCE TO RELATED APPLICATIONS

This application is the United States National Stage Application under 35 U.S.C. 371 of PCT Application No. PCT/EP2015/079831, filed Dec. 15, 2015, the entire disclosure of which is incorporated herein by reference.

BACKGROUND OF THE INVENTION

The present invention relates to a drive assembly for a manually driven vehicle, in particular a bicycle or a pedelec, comprising an electric auxiliary drive, the drive assembly comprising a first drive shaft for a manual drive and a rotor of the electric auxiliary drive, the first drive shaft and the rotor of the electric auxiliary drive being coupled to a common output element.

The present invention also relates to a vehicle comprising a drive assembly of this kind. The present invention further relates to a method for controlling a drive assembly for a manually driven vehicle comprising an electric auxiliary drive. The present invention also relates to a method for controlling a vehicle, in particular a bicycle or a pedelec. The present invention further relates to the use of a strain wave gear for additively combining a manual drive and an electric auxiliary drive.

Manually driven vehicles, in particular bicycles or pedelecs, in which a pedaler driving the vehicle by muscular power is assisted by an electric auxiliary motor have been known for a long time. For example, WO 91/19637 A1 discloses planetary gearing for hybrid vehicles, in which a sun gear meshes with a plurality of planet gears on a central hub comprising a centered flange, one side of which planet gears is connected to the planet carrier by means of screws and the other side of which is connected to the flange and thus to the hub. Furthermore, the Swiss patent application CH 705521 A2, for example, discloses a drive system comprising planetary gearing for vehicles driven by muscular power and by an electric auxiliary motor, in which a planetary gear set and the electric auxiliary motor are accommodated in a housing which forms the hub of the driving wheel. In this case, the sun gear driven by the auxiliary motor and the outer ring driven by the muscular power are rotatably mounted on a central, non-rotatable spindle that is connected to the frame of the vehicle, and the planet carrier is torque-transmittingly coupled to the driving wheel of the vehicle that forms the hub housing.

Furthermore, EP 0 569 954 A1 discloses a bicycle comprising an electric motor having a torque sensor provided for determining the pedal force, and a corresponding controller for the electric drive. Furthermore, the Japanese document JP-H-0899686 A, for example, discloses a motor-assisted drive system for a bicycle comprising a torque sensor on the chain drive in the rear wheel. Furthermore, JP 2011-168180 A also discloses a drive-assisted bicycle of this kind comprising a torque sensor for determining a pedal torque.

Moreover, AT 40138, for example, proposes a motor gear assembly for an electric drive of vehicles, in particular bicycles, and proposes an ironless disk armature and a cycloidal gear.

In this case, a flange which separates the motor from the gear in the axial direction is designed having a permanent field return path, the disk armature being connected to a hollow shaft and being mounted on the flange by means of said shaft, and, on the drive side, the gear being mounted on the hollow shaft and on a part that engages over the gear.

However, the proposed drive assemblies for assisting manual drives by means of a motor generally require a relatively large amount of installation space. Furthermore, the mechanical design thereof is relatively complex. Finally, torque sensors should often be provided so as to allow an electric auxiliary drive to be controlled in order to couple the power from the electric auxiliary drive into the manual drivetrain.

An object of the present invention is therefore to provide a drive assembly for a manually driven vehicle, in particular a bicycle or a pedelec, which has a simple and compact design and makes it possible to couple an electric drive into the manual drivetrain without using any torque sensors.

SUMMARY OF THE INVENTION

According to a first aspect of the invention, a drive assembly for a manually driven vehicle, in particular a bicycle or a pedelec, comprising an electric auxiliary drive is therefore proposed, the drive assembly comprising a first drive shaft for a manual drive and a rotor of the electric auxiliary drive, and the first drive shaft and the rotor of the electric auxiliary drive being coupled to a common output element, characterized in that the first drive shaft and the rotor of the electric auxiliary drive are coupled to the output element by means of a strain wave gear, the strain wave gear comprising an outer sleeve having an internal toothing system and a deformable inner sleeve having an external toothing system, and a wave generator, the wave generator being at least indirectly connected to the rotor of the electric auxiliary drive for rotation therewith, the deformable inner sleeve being at least indirectly connected to the first drive shaft for rotation therewith, and the outer sleeve forming the output element.

The term "pedelec" denotes a bicycle in which the pedaler's pedaling is assisted by an electric drive. If the pedaler is not pedaling, the electric auxiliary drive does not provide any drive. In principle, in the context of the application, the "vehicle" may be a two-wheeled bicycle, but may also be a vehicle comprising more than two wheels or comprising fewer than two wheels.

The invention can also be used in vehicles that do not comprise any wheels, for example in a watercraft comprising a paddlewheel drive or the like. The vehicle may also be, for example, a handcycle, in which the pedals are operated by the hands.

In this context, the term "manual" means driving by muscular power.

Therefore, the vehicle is a vehicle driven by muscular power, in particular a two-wheeled vehicle, such as a bicycle or a pedelec.

A "strain wave gear" is known and is also referred to, inter alia, as a harmonic drive. In the English language normally the term "strain wave gear" is used. The operating principle of a strain wave gear is explained in the detailed description of the figures in view of FIG. 1.

In the context of the present application, "at least indirectly" means that two elements are interconnected either indirectly, i.e. by means of one or more additional elements, or directly, i.e. without any intermediate elements.

According to another, second aspect, the use of a strain wave gear is proposed for additively combining a manual drive and an electric auxiliary drive, in particular the rotational speed of a manual drive and of an electric auxiliary drive, in a manually driven vehicle, in particular a bicycle or a pedelec.

According to another, third aspect, a vehicle, in particular a bicycle or a pedelec, comprising a drive assembly according to the first aspect of the invention or to one of the embodiments thereof, is proposed, the vehicle, in particular a wheel of the vehicle or a rear wheel of the vehicle, being driven by the drive assembly, and the vehicle comprising a control device for controlling the electric auxiliary drive.

The use of a strain wave gear for additively coupling the manual drive and the electric auxiliary drive provides for a very compact drive assembly, in particular since a one-stage strain wave gear can be used to transfer the driving speed of the electric auxiliary drive to the output element.

Furthermore, strain wave gears can be manufactured in series production in a more cost-effective manner than two-stage or three-stage gear units. This provides for an electric auxiliary drive that has high rotational speeds. The strain wave gear can be designed having reduction ratios in the range of from 1:50 to 1:200 without any problems. This makes it possible for the electric auxiliary drive to have a very low weight. Furthermore, the torque on the manual drive, the torque on the electric auxiliary drive following the gear reduction and the torque on the output element are identical.

The rotational speed of the manual drive and the rotational speed of the electric auxiliary drive are added together. As a result, expensive force sensors and/or torque sensors can be omitted, meaning that the drive assembly can be manufactured in a more cost-effective manner. Adding the rotational speeds together is also a suitable approach for generating driving assistance profiles for sports drivers.

According to another, fourth aspect of the invention, a method for controlling a drive assembly for a manually driven vehicle comprising an electric auxiliary drive, in particular a drive assembly according to the first aspect of the invention or to one of the embodiments thereof, is proposed, said method comprising the following steps: detecting a rotational speed of a first drive shaft for a manual drive, determining a desired rotational speed of the electric auxiliary drive depending from the rotational speed of the first drive shaft, and controlling the rotational speed of the electric auxiliary drive, with the desired rotational speed of the electric auxiliary drive being the target setting.

This makes it possible to use the drive assembly together with the additional drive motor as electronic gearing. A conventional mechanical gear shifting system can thus be omitted. The provision of the desired rotational speed of the electric auxiliary drive and of the desired driving torque of the additional drive motor can be determined, for example, by determining these values from specified data relating to the driving power and the rotational speed that could be applied by the pedaler. It is then possible to determine the driving torque that should be added by the additional drive motor and the rotational speed that should be applied by the electric auxiliary drive. Torque and rotational speed can be freely set in this drive system. In particular, it is for example also possible to allow the electric auxiliary drive to operate at a negative rotational speed, i.e. counter to the direction in which the pedaler is pedaling, and therefore the pedaler can pedal at very high rotational speeds but with very low torque.

The object mentioned at the outset is therefore completely achieved.

In an embodiment of the drive assembly, the outer sleeve can be cylindrical, in particular can have a circular cross section, the deformable inner sleeve can be cylindrical, in particular can have a circular cross section, and the wave generator can have an elliptical cross section, an ellipse of the cross section in particular having an eccentricity of $0<e<1$. In other words, the ellipse is not a circle.

The inner sleeve is thus deformable. An optionally circular cross section can thus be deformed by the wave generator to form an elliptical cross section. Owing to the cylindrical design, it is possible for the inner sleeve, the outer sleeve and the wave generator to be arranged in a nesting manner around the first drive shaft in the axial direction, i.e. radially to a longitudinal axis of the first drive shaft, and for installation space to be saved as a result.

In another embodiment of the drive assembly, the drive assembly comprises a second drive shaft which is designed as a hollow shaft and is connected to the rotor of the electric auxiliary drive for rotation therewith, the first drive shaft extending through the second drive shaft.

This makes it possible for the electric auxiliary drive to be arranged so as to be axially offset from the strain wave gear and to be coupled to the strain wave gear for rotation therewith by means of the first drive shaft. The rotation of the generator is then transmitted to the strain wave gear by means of the first drive shaft. This results in further radial installation space being saved. In another embodiment of the drive assembly, the second drive shaft can comprise an end portion that has an elliptical cross section, the end portion forming the wave generator.

In this way, a particularly compact construction can be achieved, in which an end portion of the shaft having the elliptical cross section is formed and is thus used as the wave generator at the same time. The end portion of the second drive shaft thus axially overlaps the inner sleeve and the outer sleeve.

In another embodiment of the drive assembly, the second drive shaft can comprise an end portion, a rolling bearing having an elliptical cross section being arranged between the end portion and the inner sleeve.

In this way, a wave generator can be provided. The rolling bearing also causes the wave generator to roll on the inner sleeve, with as little resistance as possible. However, it is also possible, in principle, for the wave generator, for example the end portion of the second drive shaft, to be brought into direct contact with the inner sleeve, without there being a rolling bearing arranged therebetween.

In another embodiment of the drive assembly, the output element can be at least indirectly connected to a sprocket wheel for rotation therewith.

This therefore makes it possible for a sprocket wheel to be directly driven by means of the output element, which sprocket wheel in turn drives, for example, a wheel of the vehicle, for example the rear wheel thereof, by means of a chain.

In another embodiment of the drive assembly, it is possible for the drive assembly to comprise a rotational position sensor for detecting a rotational position of the first drive shaft.

This makes it possible to also determine, from the rotational position, a rotational speed of the first drive shaft and thus a rotational speed of the manual drive. The pedaler's cadence can thus be detected and a rotational speed that should be supplied by means of the electric auxiliary drive can be determined therefrom.

In another embodiment of the drive assembly, the drive assembly can comprise a rotational position sensor for detecting a rotational position of the second drive shaft and/or a rotational position sensor for detecting a rotational position of the rotor of the electric auxiliary drive.

In principle, for the purpose of controlling the electric auxiliary drive, the rotational speed of the rotor should be detected either directly, or indirectly in the form of the rotational speed of an element coupled to the rotor for rotation therewith, for example the second drive shaft.

In another embodiment, the outer sleeve can be cylindrical and can have an inner opening, the first drive shaft extending through the inner opening.

The outer sleeve is thus arranged around the first drive shaft. In particular, the first drive shaft extends centrally through the entire drive assembly. This allows the elements of the strain wave gear and of the electric auxiliary drive to utilize the installation space around the first drive shaft in a compact manner.

In another embodiment, the drive assembly can comprise a housing, in particular a three-part housing, which is arranged around the first drive shaft, a first housing element comprising an opening through which the output element and the first drive shaft are extending and a third housing element comprising an opening through which the first drive shaft is extending, and a second housing element being arranged between the first housing element and the third housing element.

This three-part design provides for a simple assembly of all of the components of the drive assembly, in particular by successive attachment to the first drive shaft. The first drive shaft projects from the housing at either end. The pedals for the manual drive, for example, can be arranged on the drive shaft.

In another embodiment of the drive assembly, the outer sleeve can comprise a first portion of one diameter, on which the internal toothing system is arranged, and a second portion of a diameter that is smaller than the first diameter, the second portion extending through an opening in a first housing element.

The second portion having the small diameter is thus extending out of the housing through the opening in a first housing part around the first drive shaft. Inside the housing, the outer sleeve then expands to the first diameter so as to be able to form the strain wave gear in this portion.

In another embodiment of the drive assembly, the first drive shaft can be supported in the outer sleeve by means of a first rolling bearing, the outer sleeve being supported in a housing of the drive assembly, in particular in the first housing element thereof, by means of at least one second rolling bearing. The first drive shaft thus cannot be supported directly in the housing at every point. It can be provided that the first drive shaft be initially supported in the outer sleeve by means of a first rolling bearing. The outer sleeve can, in turn, be supported in the housing, in particular the first housing element, by means of at least one second rolling bearing, preferably two rolling bearings. This makes it possible for the elements to be axially nested in a compact manner such that they take up little installation space.

In another embodiment, the first rolling bearing and one rolling bearing of the at least one second rolling bearing can be arranged so as to overlap at least in part in an axial direction with respect to a longitudinal axis of the first drive shaft.

In this way, power can flow radially from the first drive shaft into the housing directly via the first rolling bearing, the outer sleeve and one rolling bearing of the at least one second rolling bearing. When the drive assembly is installed in a bicycle, the drive assembly is used, at the same time, as the bottom bracket for the driver and can be arranged in a hub of the bicycle frame.

In this case, the pedals are arranged in the outer ends of the first drive shaft. The pedals thus absorb the driving forces and the weight forces of the pedaler. In this respect, it is expedient for these forces to be introduced into the housing of the drive assembly in as direct a manner as possible and for these forces to be introduced into the bicycle frame via said housing. The overlapping arrangement of the first rolling bearing and one rolling bearing of the at least one second rolling bearing results in the forces being radially transmitted in this manner away from the first drive shaft and into the housing via the shortest route. The region of the strain wave gear and of the electric auxiliary drive can thus be kept free of these forces.

In another embodiment, the second drive shaft can be supported in a housing of the drive assembly, in particular in the second housing element thereof, by means of a third rolling bearing, the second drive shaft being supported in the housing, in particular in the third housing element thereof, by means of a fourth rolling bearing.

In another embodiment of the drive assembly, the second drive shaft can be supported in a housing of the drive assembly, in particular in the second housing element thereof, by means of a third rolling bearing, the second drive shaft being supported in the housing, in particular in the third housing element thereof, by means of a fourth rolling bearing. Owing to the second drive shaft being supported in both the second housing element and the third housing element, the second drive shaft is sufficiently supported and guided in a reliable manner.

In particular, a high degree of operational reliability can thus be provided.

In another embodiment of the drive assembly, the first drive shaft can be supported in a housing of the drive assembly, in particular in the third housing element thereof, by means of a fifth rolling bearing.

In particular, said fifth rolling bearing can be arranged on a side of the housing that is remote from the strain wave gear and/or the output element. This ensures that one end of the first drive shaft is supported directly in the housing directly at the entrance to the third housing part. The opposite end of the first drive shaft can be supported in the first housing element by means of the first rolling bearing and one of the at least one second rolling bearing. Forces in the radial direction and/or the vertical direction in the installed state are thus introduced into the housing directly at the entrance to the housing, and elements located between the bearings, such as the electric auxiliary drive and the strain wave gear, remain force-free.

In an embodiment of a vehicle, the drive assembly can be arranged in a frame of the vehicle and can form a bottom bracket of the vehicle, the first drive shaft being in particular connected to two pedals for rotation therewith.

This makes it possible to install the drive assembly directly in the frame of the vehicle as a bottom bracket in a space-saving manner.

In another embodiment, the drive assembly can be coupled to a wheel of the vehicle by means of a gearing system. This makes it possible, by means of the gearing system, for rotational speeds and torques to be converted between the drive assembly and the wheel in the conventional manner using a gearing system, in particular a mechanical gearing system.

In another embodiment, the vehicle can comprise a speed sensor for measuring a speed of the vehicle. This makes it possible to monitor a speed of the vehicle and to optionally adjust control of the electric auxiliary drive on the basis of the speed. This may be necessary in particular for implementing certain presettings for motor-operated drives within certain speed ranges.

In another embodiment of the vehicle, the vehicle can comprise, in addition to the drive assembly, an additional drive motor for driving the vehicle, in particular a wheel or an additional wheel of the vehicle. In the case of a bicycle, the additional drive motor can thus drive the rear wheel or the front wheel, for example. This makes it possible to directly set a driving torque by means of the additional drive motor. By means of the drive assembly, a rotational speed of the drive can be set owing to the rotational speed of the manual drive and the rotational speed of the electric auxiliary drive being additively combined by means of the strain wave gear. This allows a driving power to be split freely between torque and rotational speed according to the equation P=2·n·M·n, where P is the driving power in watts [W], M is the driving torque in newton meters [Nm] and n is the driving speed in revolutions per second [1/s]. In other words, by means of an embodiment of this kind, quasi gear shifting can thus be provided by electronic control, without a mechanical gearing system having to be provided. The rotational speed at which a pedaler should pedal can be set as desired.

In another embodiment of the method, the step of detecting a speed of the vehicle can be provided, the desired rotational speed also being determined according to the determined speed of the vehicle.

In this way, it can for example be provided that, when a certain speed is reached or exceeded, the electric auxiliary drive no longer provides the pedaler with any assistance whatsoever.

In another embodiment of the method, a desired rotational speed can be zero when a rotational speed of the first drive shaft is zero.

As a result, a pedelec is controlled in the conventional manner. If the pedaler himself is not pedaling, the vehicle or bicycle is not driven electrically either.

In another embodiment of the method, the desired rotational speed can be specified as being linearly dependent on the rotational speed of the first drive shaft, at least when the rotational speed of the first drive shaft is in a range close to zero.

In this respect, in this range, the desired rotational speed can be determined according to the formula n2=a·n,+b, where the variable n2 is the desired rotational speed and n1 is the rotational speed of the first drive shaft, i.e. the rate at which the pedaler is pedaling. Coefficients a and b are parameters. If the desired rotational speed is zero for the rotational speed of a first drive shaft, b should be set such that b=zero.

It can also be provided that a coefficient of the linear dependency, in particular coefficient a, is adjustable.

In this manner, assistance by the electric auxiliary motor can be specified by the settable coefficient a. If a is set such that a=1, the electric auxiliary drive adds an identical rotational speed to the rotational speed from the pedaler or of the first drive shaft. In this case, 50% of the driving power is generated by the pedaler and the other 50% is generated by the electric auxiliary drive. Accordingly, if a is fixed such that a<1, less than 50% of the driving power is generated by the electric auxiliary drive. Accordingly, if the value for a is selected such that a>1, more than 50% of the driving power is provided by the electric auxiliary drive.

In another embodiment of the method, the value for a desired rotational speed of the motor can be limited to a maximum rotational speed.

In this way, the rotational speed of the motor can be limited in both the positive direction and the negative direction. This makes it possible to prevent the motor from getting damaged as a result of being improperly adjusted to too high a rotational speed.

In another embodiment of the method, the desired rotational speed can be zero at a predetermined speed limit.

In this way, it can be stipulated, for example, that the desired rotational speed be zero when a speed of 25 km/h is reached or exceeded, i.e. the electric auxiliary drive will no longer provide any assistance whatsoever. In this way, as an example, legal regulations relating to the requirement for the vehicle to alert the driver can be observed, for example by the electric drive only providing assistance below a speed of 25 km/h.

In another embodiment of the method, the desired rotational speed can be positive when the first drive shaft is at at least a first rotational speed and can be negative when the first drive shaft is at at least a second rotational speed. Therefore, the electric auxiliary drive can operate both with the pedaler and against the pedaler. In particular, in the event that both the driving speed in the drive assembly and a driving torque are controlled electronically by means of an additional drive motor, if the electric auxiliary drive is at a negative rotational speed, a very high rotational speed can be provided for the pedaler. This makes it possible to simulate very small gears in a mechanical gear shifting system. The features that are mentioned above and those that will be explained in the following can, of course, be used not only in the combination specified in each case, but rather also in other combinations or independently, without departing from the scope of the present invention.

BRIEF DESCRIPTION OF THE DRAWINGS

Embodiments of the invention are shown in the drawings and will be explained in greater detail in the following description. In the drawings:

FIG. 7a shows a possible control model for the drive assembly.

DETAILED DESCRIPTION

Figure 1:
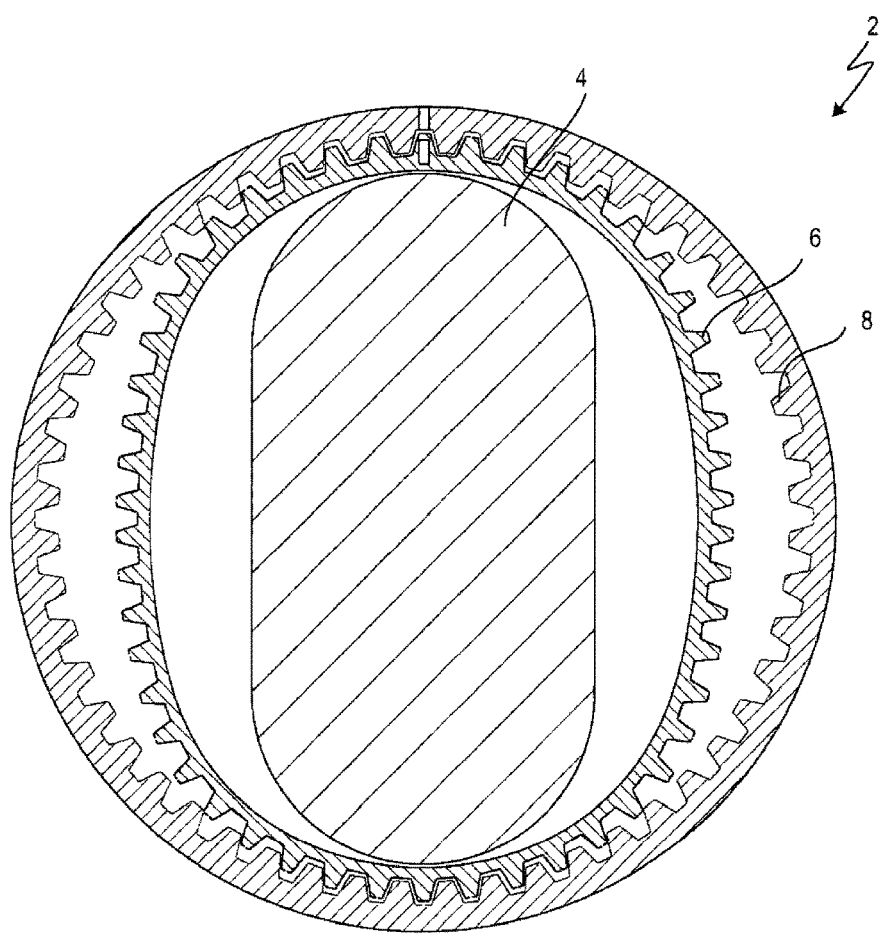
FIG. 1 is a schematic view of a strain wave gear for illustrating the function thereof.

FIG. 1 is a schematic view of a strain wave gear 2. The operating principle of a strain wave gear should first be explained briefly, on the basis of this diagram. The strain wave gear comprises a wave generator 4, an inner sleeve 6 and an outer sleeve 8. The outer sleeve 8 comprises an internal toothing system and the inner sleeve 6 comprises an external toothing system, which systems mesh with one another by two circumferential portions.

The cross section of the outer sleeve is circular. The inner sleeve 6 is deformable. The basic shape of said inner sleeve is also a circle. By means of the wave generator 4, which is elongate or elliptical, the external toothing system of the inner sleeve is urged into engagement with the internal toothing system of the outer sleeve 8 by two circumferential portions. The number of teeth in the external toothing system of the inner sleeve 6 and the number of teeth in the internal toothing system of the outer sleeve 8 are different from one another. For example, they may differ from one another by one tooth. For example, if the outer sleeve 8 is locked in position and the wave generator 4 is rotated, the external toothing system of the inner sleeve 6 rolls on the internal toothing system of the outer sleeve 8. If the wave generator rotates by one full rotation, the inner sleeve moves relative to the outer sleeve 8 by one tooth pitch. This makes it possible to provide a very high gear ratio between an input rotational speed and an output rotational speed, which is in this case the rotational speed of the inner sleeve 6. If, as is the case in the context of the present invention, the outer sleeve 8 is used as an output element, drive-side power can be introduced into the strain wave gear 2 both by means of the inner sleeve 6 and at the wave generator. A particular feature of this is that a torque of the output element, i.e. a torque of the outer sleeve 8, a torque of the inner sleeve 6 and a torque of the wave generator 4 following the gear ratio conversion are identical. An input-side rotational speed of the inner sleeve 6 and a rotational speed of the wave generator 4 following the gear ratio conversion are added together to generate an output rotational speed of the outer sleeve 8. If, for example, the wave generator were to be operated at an input rotational speed of 5,000 rpm, and if the number of teeth in the external toothing system of the inner sleeve 6 and the number of teeth in the internal toothing system of the outer sleeve 8 were to be selected such that there is a speed conversion ratio of 1:50, the wave generator would supply a rotational speed of 100 rpm to the output side. If the inner sleeve 6 were to directly supply a further 100 rpm, the outer sleeve 8 would thus rotate at an overall speed of 200 rpm.

Owing to the high gear ratio, it is highly possible to additively combine a very high input rotational speed on the wave generator 4, for example the rotational speed of an electric motor, with a lower rotational speed on the inner sleeve, for example a rotational speed from a pedaler, on a common output element, which is in this case the outer sleeve 8.

Figure 2:
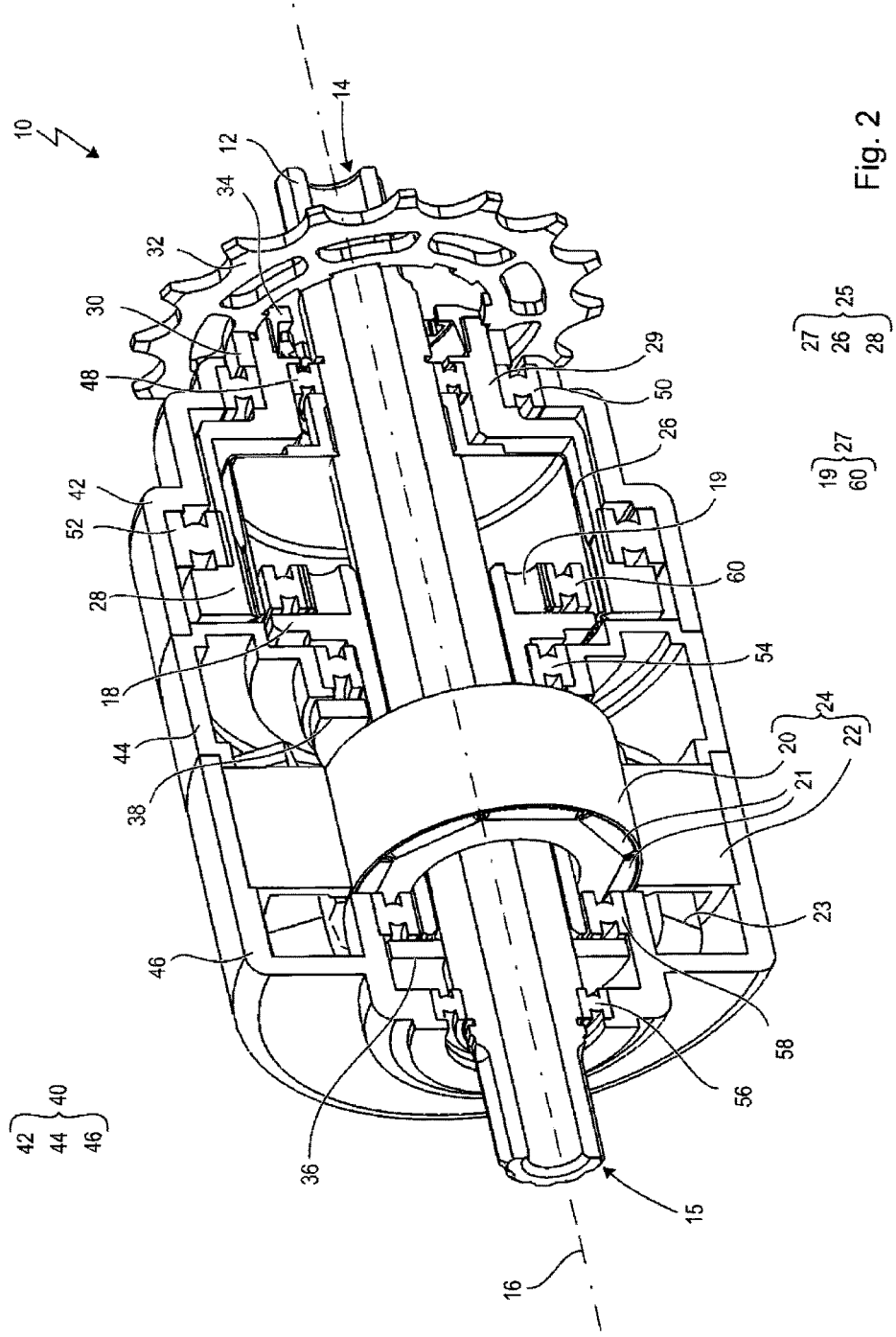
FIG. 2 shows an embodiment of a drive assembly.

A specific embodiment of a drive assembly 10 of this kind is shown in FIG. 2.

The drive assembly 10 comprises a first drive shaft 12. The first drive shaft 12 is provided for the manual drive of the drive assembly 10. The first drive shaft 12 comprises a first end 14 and a second end 15 which are opposite one another. One pedal can be arranged at each of these ends for rotation therewith. By means of the pedals, the first drive shaft 12 can be manually driven. The drive shaft 12 has a longitudinal axis 16 about which it rotates. Furthermore, a second drive shaft 18 is provided. The second drive shaft 18 comprises an end portion 19. The end portion 19 faces towards the first end 14 of the first drive shaft.

The second drive shaft 18 is connected to a rotor 20 of an electric auxiliary drive 24 for rotation therewith. The electric auxiliary drive 24 also comprises a stator 22. A plurality of permanent magnets 21 are arranged in the rotor 20. Motor windings 23 are arranged in the stator 22. As is the case in the embodiment shown, the electric auxiliary drive 24 can also be formed by another suitable type of drive. In this way, the rotor can be coupled to a strain wave gear 25 by means of the second drive shaft 18. The strain wave gear 25 comprises an inner sleeve 26, a wave generator 27 and an outer sleeve 28. The wave generator 27 is formed by the end portion 19 of the second drive shaft 18 and a rolling bearing 60.

The rolling bearing 60 is arranged between the end portion 19 and the inner sleeve 26.

The inner sleeve 26 is cylindrical. In the region of the wave generator 27, the inner sleeve 26 is designed having a first, relatively large cross-sectional diameter and is elastically deformable at this point. In this region, the inner sleeve 26 comprises an external toothing system. Furthermore, the inner sleeve 26 comprises a region 33 that has a smaller diameter. In this region, the inner sleeve 26 is connected to the first drive shaft 12 for rotation therewith. The outer sleeve 28 forms an output element 29 of the strain wave gear 25. The output element 29 is coupled to a sprocket wheel 32 for rotation therewith. By means of the sprocket wheel 32, the drive assembly 10 can be coupled to a wheel of a vehicle, for example. The sprocket wheel 32 is secured by means of a nut 34 and is spaced apart from a rolling bearing 50 by means of a spacer 30, and therefore the sprocket wheel 32 can rotate freely.

Furthermore, the drive assembly 10 comprises a first position sensor 36.

On this point, an element of which the position can be detected is correspondingly coupled to the first drive shaft 12 for rotation therewith. This makes it possible to detect the rotational speed of the first drive shaft 12.

Furthermore, a position sensor 38 for detecting a rotational position of the second drive shaft 18 is provided. The second drive shaft also comprises a disc element which is coupled to the second drive shaft 18 for rotation therewith. In this way, a position of the second drive shaft 18 can be determined and a rotational speed of the second drive shaft 18 can be established in particular.

The drive assembly 10 comprises a housing which is denoted by reference numeral 40 as a whole. The housing is formed in three parts and comprises a first housing element 42, a second housing element 44 and a third housing element 46.

The first housing element 42, the second housing element 44 and the third housing element 46 are each substantially cylindrical and are each arranged around the first drive shaft 12. In this case, the second housing element 44 is arranged between the first housing element 42 and the third housing element 46.

The first drive shaft 12 is supported in the outer sleeve 28 by means of a first rolling bearing 48. Furthermore, the first drive shaft 12 is supported in the third housing element 46 by means of a fourth rolling bearing 56. The fourth rolling bearing 56 and the first rolling bearing 48 are arranged substantially opposite one another at the ends of the housing 40. The first drive shaft 12 thus directly introduces forces, occurring in the radial direction with respect to the longitudinal axis 16, into the housing 40 by means of the first rolling bearing 48 and the fourth rolling bearing 56. An intermediate space remains substantially free of forces perpendicular to the longitudinal axis 16. The outer sleeve 28 is supported in the first housing element 42 by means of two second rolling bearings 50 and 52. In this case, the first rolling bearing 48 and the second rolling bearing 50 are arranged so as to overlap with respect to the axial direction along the longitudinal axis 16. This means that said bearings are positioned substantially at the same height in the axial direction. The forces perpendicular to the longitudinal axis 16 are thus introduced radially into the housing 40 by means of the first rolling bearing 48 and the second rolling bearing 50 substantially in a straight line.

The second drive shaft 18 is supported in the second housing element 44 by means of a third rolling bearing 54. Furthermore, the second drive shaft 18 is supported in the third housing element 46 by means of a fifth rolling bearing 58.

In the context of the application, it is possible, in principle, for the rolling bearings to each be designed as a ball bearing, cone bearing, tunnel bearing, needle bearing or any other suitable type of rolling bearing.

Figure 3:
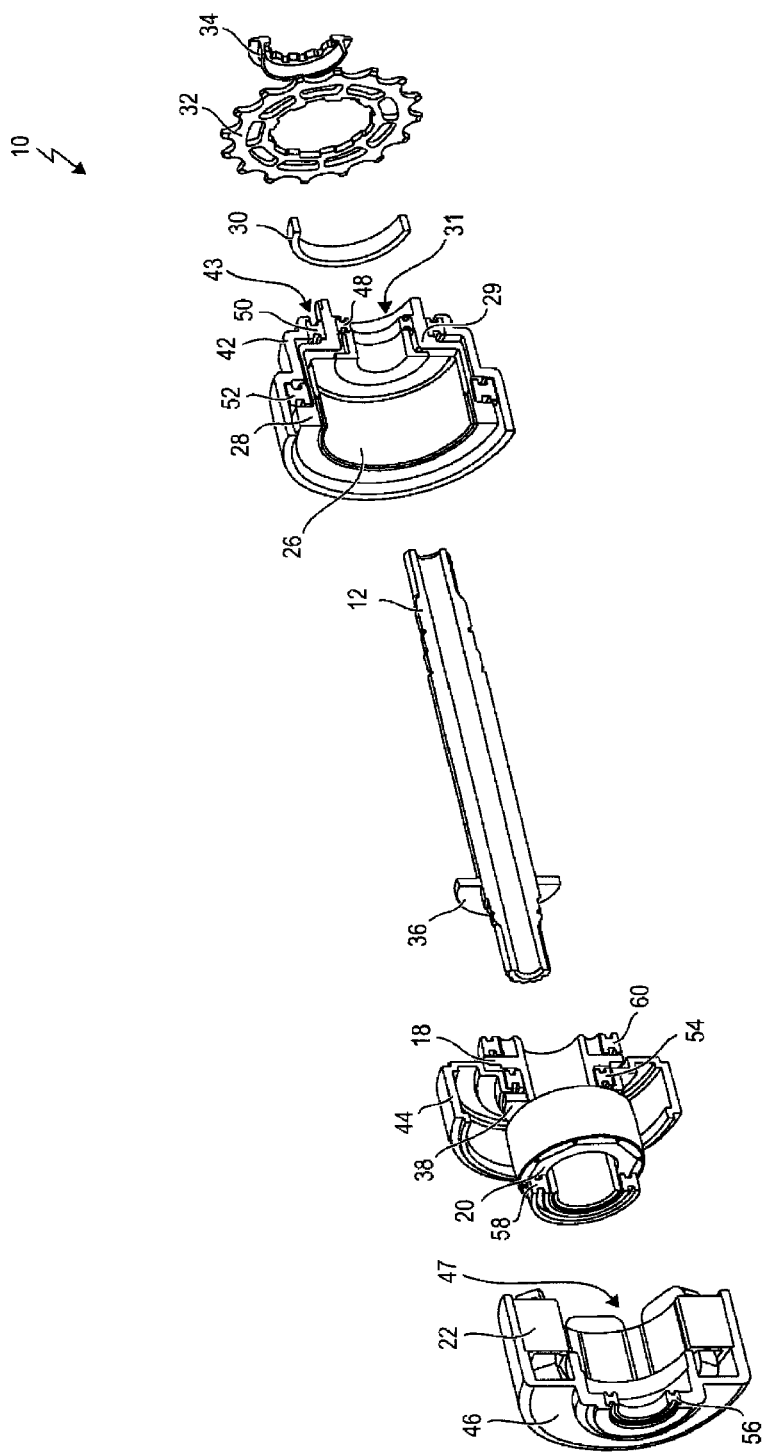
FIG. 3 is an exploded view of the drive assembly in FIG. 2.

FIG. 3 is an exploded symmetrical view of the drive assembly 10 from FIG. 2. The individual modules of the assembly can be seen. In particular, the figure shows an inner opening 31 in the outer sleeve 28 through which the first drive shaft 12 is extending and mounted in said outer sleeve by means of the first rolling bearing 48. Concentrically with the inner opening 31, there extends an opening 43 in the first housing element 42 through which the outer sleeve 28 is extending and the outer sleeve 28 is mounted in said first housing element by means of one rolling bearing 50 of the second rolling bearings 50 and 52. The figure also shows an opening 47 in the third housing element 46 through which the second end 15 of the first drive shaft 12 extends.

Figure 4:
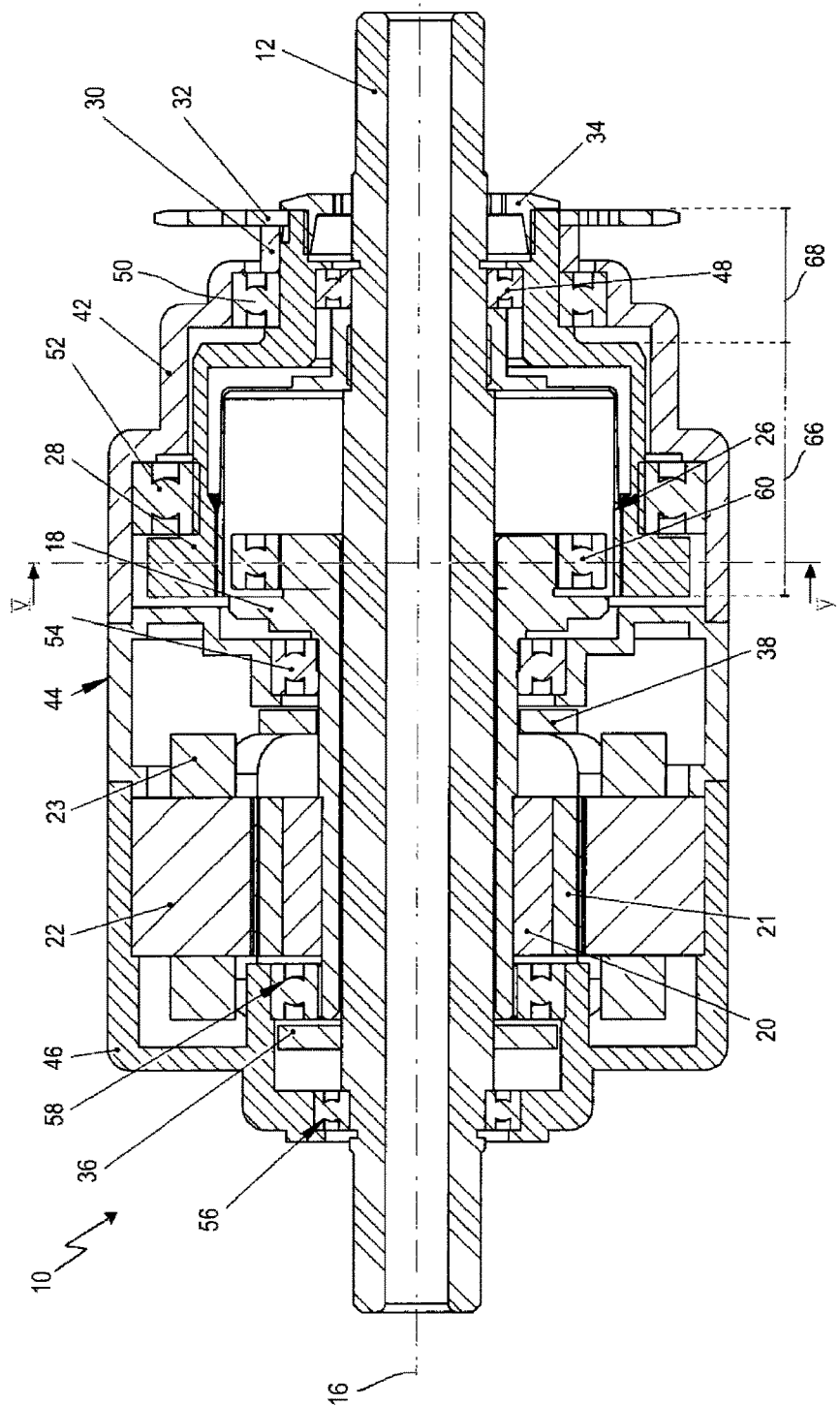
FIG. 4 is a longitudinal cross-sectional view of the drive assembly in FIG. 2.

FIG. 4 is a longitudinal section through the drive assembly 10. The same elements are provided with the same reference numerals and are not explained again in the following.

The design of the inner sleeve 26 is also illustrated. The region 33 that has the smaller diameter has a relatively large wall thickness. In this region, the inner sleeve 26 is connected to the first drive shaft 12 for rotation therewith. A portion of the inner sleeve 26 that has a larger diameter and that fits onto the external toothing system has a substantially lower wall thickness, and therefore the inner sleeve can be deformed by the wave generator 27.

The outer sleeve 28 also comprises a region 66 that has a larger diameter and a region 68 that has a smaller diameter. The internal toothing system is formed in the region 66 that has the larger diameter. The region that has the smaller diameter is extending through the opening 43 in the first housing element. The first rolling bearing 48 and the second rolling bearing 50 are also located in the region that has the smaller diameter. The region 66 that has the larger diameter is supported with respect to the first housing element 48 by means of an additional second rolling bearing 52.

In this way, the power introduced by means of the first drive shaft 12 and the power introduced into the strain wave gear 25 by means of the rotor 20 or the second drive shaft 18 can be combined by means of a common output element 29, formed by the outer sleeve 28, on the sprocket wheel 32 in order to drive a vehicle.

Figure 5:
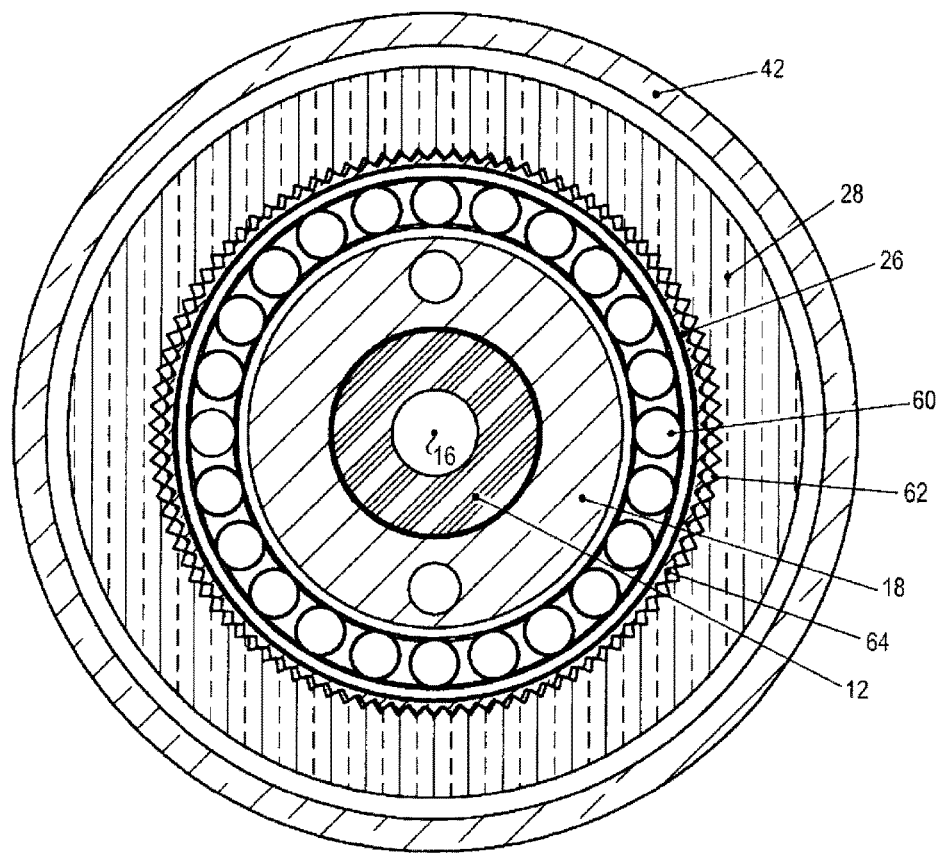
FIG. 5 is a section along a line V-V in FIG. 4.

FIG. 5 is a section along the line V-V in FIG. 4. It shows the design of the strain wave gear 25 in the radial direction. Furthermore, the first housing element 42 is in a fixed position. The outer sleeve 28, which also has a circular cross section, can rotate in said housing element. The outer sleeve 28 comprises an internal toothing system 62.

The outer circumferential cross section of the rolling bearing 60 of the strain wave gear 25 is elliptical. The external toothing system 64 of the deformable inner sleeve 26 is thus brought into meshing engagement with the outer sleeve 28 by two opposing circumferential portions. The outer circumferential cross section of the end portion 19 of the second drive shaft 18 is also elliptical in the region of the cross section. However, the outer circumferential cross section of the end portion 19 does not necessarily have to be elliptical if the outer circumferential cross section of the strain wave gear is already elliptical.

The rolling bearing 60 can be pressed onto the end portion 19. A race of the rolling bearing 60 on the outer circumferential cross section can be deformable. In this way, the end portion 19 and the rolling bearing 60 are used as the wave generator 27 and deform the inner sleeve 26. The second drive shaft 18 is designed as a hollow shaft.

The internal diameter of the second drive shaft is larger than an external diameter of the first drive shaft 12, and therefore the first drive shaft 12 is extending through the second drive shaft 18 along the longitudinal axis 16.

Figure 6:
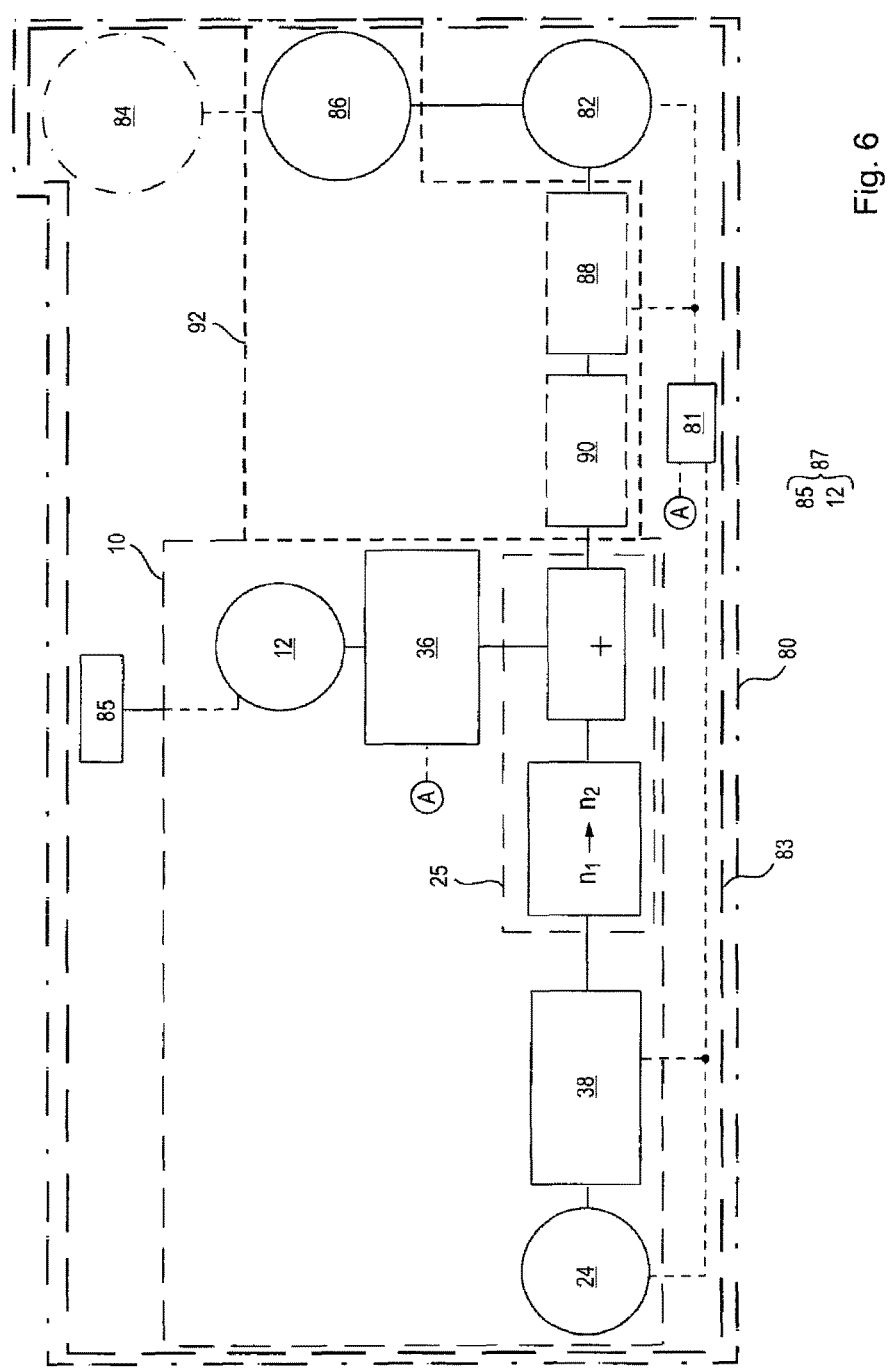
FIG. 6 is a schematic view of an embodiment of a vehicle.

FIG. 6 is a schematic representation of a vehicle 80. This vehicle may be, for example, a pedelec, i.e. a bicycle in which the driving power applied by a pedaler via pedals is assisted by the electric auxiliary drive 24. The manual driving force is applied by the pedaler via pedals 85 and the first drive shaft 12. The same elements are provided with the same reference numerals.

The drive assembly thus combines the power applied by means of the first drive shaft 12 and the power applied by the electric auxiliary drive 24, by the strain wave gear 25 adding rotational speeds together. By means of the position sensors 36 and 38, the rotational speed of the first drive shaft and a rotational speed of the second drive shaft are detected at the input of the strain wave gear 25 and entered in a control device 81. The control device 81 controls the electric auxiliary drive 24. The entire drive assembly 10 is used as the bottom bracket of the vehicle 80 and is arranged in the frame 83 of the vehicle 80.

The vehicle 80 comprises a wheel 82, which may be, for example, the rear wheel of the pedelec. Furthermore, the vehicle comprises an additional wheel 84, which may be, for example, the front wheel of the pedelec.

At the output side, the strain wave gear 25 is connected to the wheel 82 and drives said wheel and thus the vehicle 80.

A mechanical gear shifter 90 and/or a speed sensor 88 for detecting a speed of the vehicle 80 can be connected between the strain wave gear 25 and the wheel 82. The speed sensor also enters the speed of the vehicle in the control device 81. Furthermore, an additional drive motor 86 can be provided which drives the wheel 82 directly. Alternatively, the drive motor 86 can also be connected to the additional wheel 84 and can drive said additional wheel. The optional components of the additional drive 86, the speed sensor 88 and the mechanical gear shifter 90 are together denoted by reference numeral 92. If the additional drive motor 86 is provided, electronic shifting can be provided completely by means of the control device 81. In this case, a mechanical gear switcher 90 is not necessarily required.

By means of the additional drive motor 86, a driving torque on the vehicle 80 can be directly controlled. The rotational speed which should also be applied by a pedaler can be set by controlling the electric auxiliary drive 24 in a corresponding manner. In this case, the electric auxiliary drive can in particular also operate in the direction counter to the direction in which the pedaler is pedaling, such that the pedals 85 are required to operate at higher rotational speeds. The rotational direction of the electric auxiliary drive 24 can therefore be "negative" when the direction in which the pedaler is pedaling is "positive".

FIG. 7a shows a possible control model for the drive assembly 10. "Crank rotational speed" denotes a detected rotational speed of the first drive shaft 12. It can be determined from this how high a corresponding assistance rotational speed of the electric auxiliary drive 24 should be, and this is plotted on the Y axis as "motor rotational speed". In the simplest case, the rotational speed of the motor is proportional to the rate at which the pedaler is pedaling. If the pedaler is not pedaling, the rotational speed of the motor is also zero. Proceeding from this, there is a linear, proportional relationship, the rotational speed of the motor, following the conversion by the strain wave gear 25, corresponding to that of the first drive shaft. The linear relationship can also be over-proportional or under-proportional, by a coefficient, namely the gradient in the linear portion, being selected that is >1 for the over-proportional gradient or <1 for the under-proportional gradient. However, in principle, it is also possible to select any relationship n2=f(n−1). In particular, it can be provided that the rotational speed of the motor is positive at a first rotational speed 114 and the rotational speed of the motor is determined as negative at a second rotational speed 116 of the first drive shaft 12, i.e. the electric auxiliary drive is operating in the opposite direction. The desired rotational speed of the electric auxiliary drive 24 determined in this manner is then used as a control setting for the control thereof and the rotational speed is directed towards said desired rotational speed as a target value. Depending on the type of the electric auxiliary drive, a maximum rotational speed 94 that cannot be exceeded can be specified.

Figure 7B:
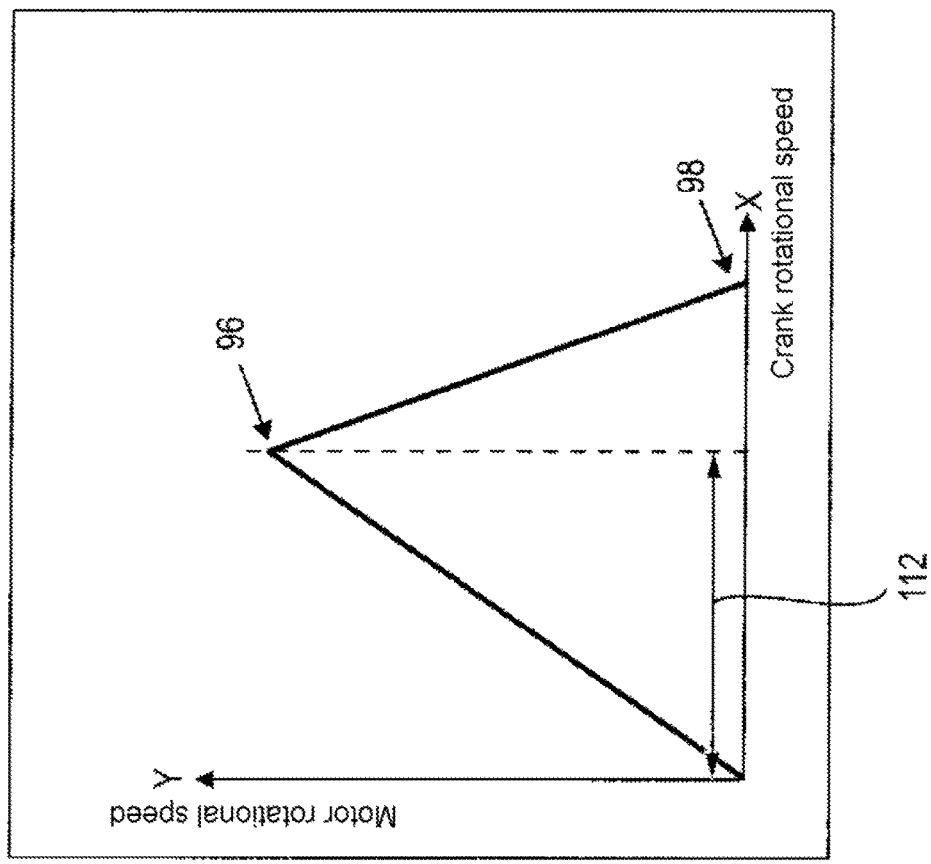
FIG. 7b shows another possible control model for the drive assembly.

FIG. 7b shows another control model. In this model too, starting from the origin (zero), there is first of all a linear portion 112 in which, as the rotational speed of the first drive shaft 12 increases, so too does the rotational speed of the electric auxiliary drive. However, in principle, this control model is multi-dimensional and is also dependent on a speed of the vehicle. In principle, a speed limit 98 can be specified, at which the electric auxiliary drive 24 is no longer permitted to give any assistance and thus a rotational speed of the electric auxiliary drive has to be zero. Accordingly, a threshold speed 96 below this speed limit can readily be specified, at or above which threshold speed a rotational speed of the electric auxiliary drive is reduced back to zero. The speed can be reduced back to zero in a linear, progressive or degressive manner.

Figure 8:
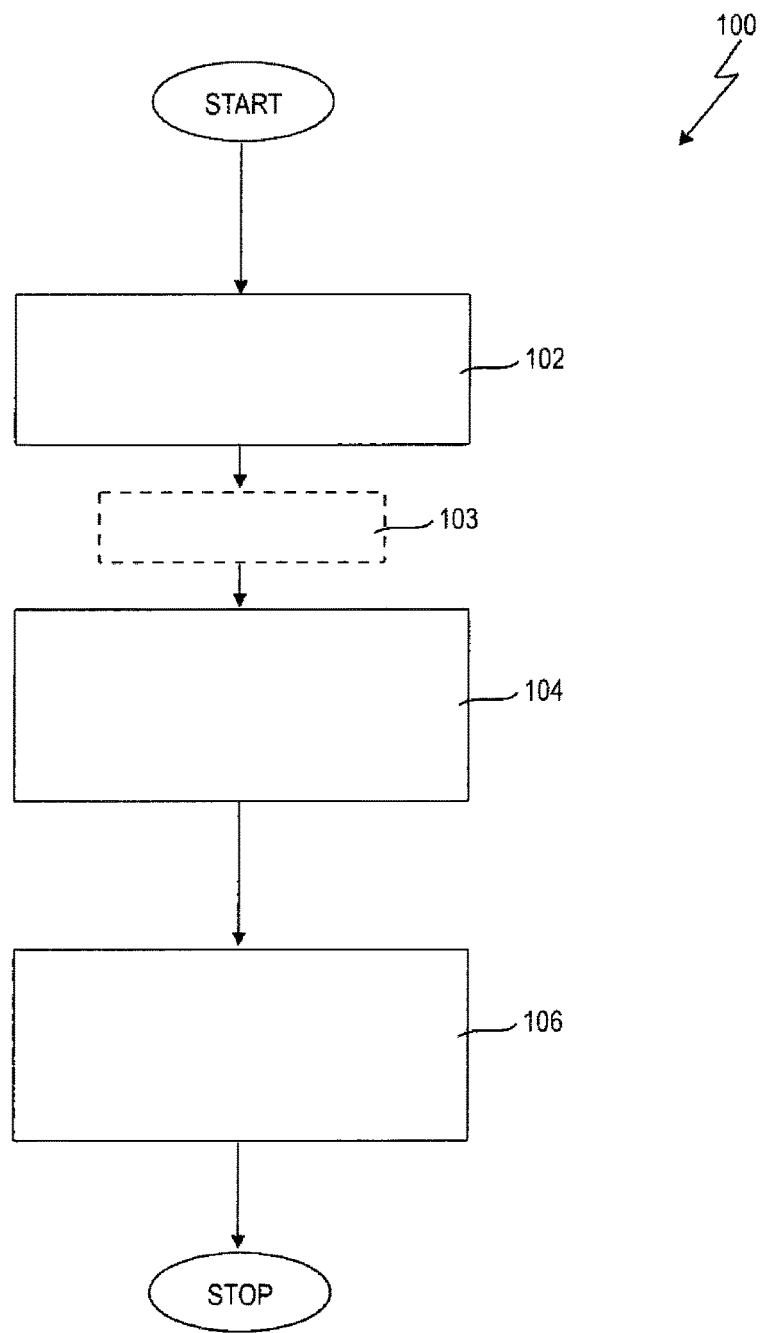
FIG. 8 is a schematic flow diagram of a method for controlling a drive assembly.

FIG. 8 is a schematic flow diagram of a method for controlling the drive assembly 10. The bicycle is denoted by reference numeral 100 in general.

First of all, in a step 102 a rotational speed of the first drive shaft for the manual drive is determined. In a step 104, a desired rotational speed of the electric auxiliary drive is subsequently determined. This desired rotational speed is at least dependent on the detected rotational speed of the first drive shaft 12. Subsequently, in a step 106, the electric auxiliary drive 24 is controlled such that the desired rotational speed determined in step 104 is reached if at all possible. In this respect, the desired rotational speed is used as a target setting for the control. The desired rotational speed can be determined in step 104 according to one of the methods shown in conjunction with FIGS. 7a and 7b for example, by said desired rotational speed being read out from a one-dimensional or multi-dimensional table or by said desired rotational speed being calculated on the basis of a corresponding function.

In principle, the method can then be repeated continuously for as long as the vehicle 80 is still being used. Accordingly, step 102 can be repeated at certain intervals, and therefore the target setting from step 104 can also modified at certain intervals and the control in step 106 can be adapted accordingly.

In a step 103, if a speed sensor is present, a speed of the vehicle can also be detected. This parameter can accordingly also influence the target setting in step 104. For example, the desired rotational speed can be fixed at zero, without exception, when a certain speed limit is exceeded, as has already been explained above.

Figure 9:
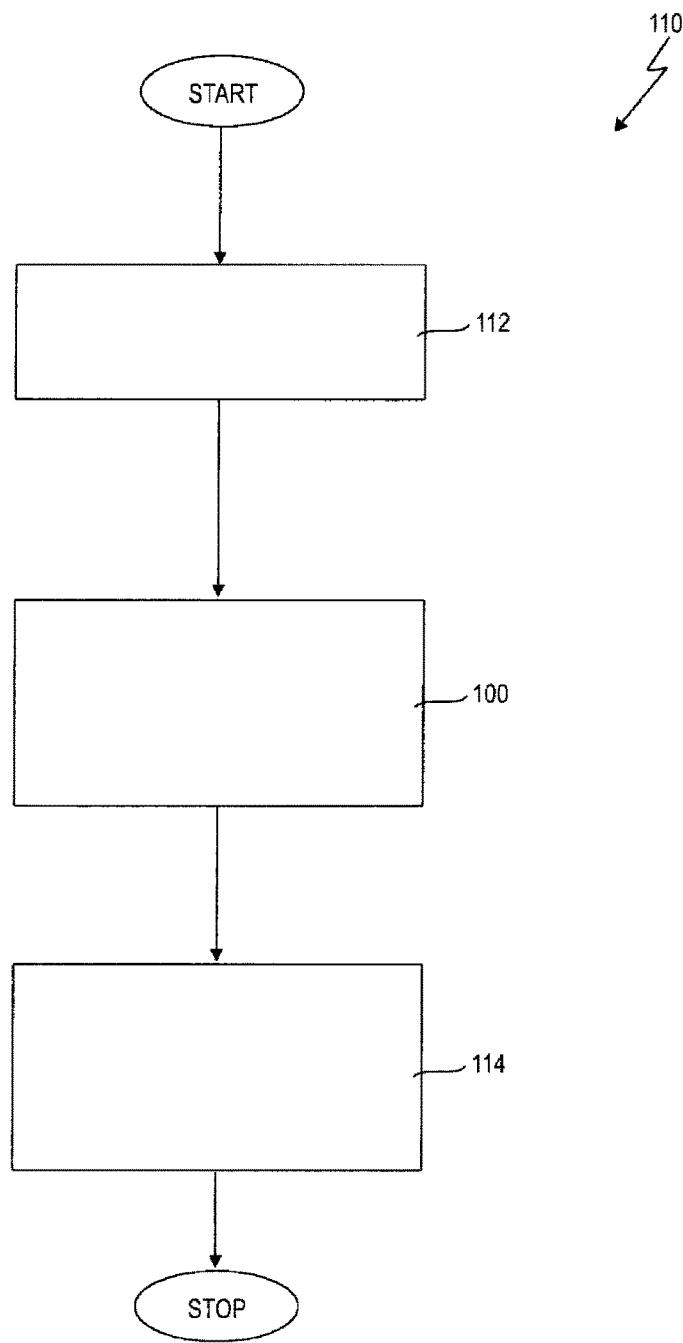
FIG. 9 is a schematic flow diagram of a method for controlling a vehicle.

FIG. 9 is a schematic flow diagram of a method 110 for controlling a vehicle. The vehicle is provided with a drive assembly 10 and also has an additional drive motor 86. In the method, first of all in a step 112 a desired rotational speed of the electric auxiliary drive 24 and a desired driving torque of the additional drive motor 86 is carried out.

This can be provided for in several ways. For example, a desired quasi gear ratio or a desired rotational speed can be specified for the pedaler. Furthermore, a desired driving power can be specified which can in turn be the result of a desired speed. It can be determined from the desired driving power what percentage thereof should be generated by means of the additional auxiliary motor. From this, it can be determined what driving torque is generated by the additional drive motor. The driving torque with which the pedaler should pedal thus remains. By means of the drive assembly, the rotational speed that should be achieved by the pedaler can then be set by means of the electric auxiliary drive by the control thereof. In this way, it is possible to provide quasi gear shifting by means of electric control. If, for example, the pedaler wishes to pedal with a high torque but at a low rotational speed, this can be set in steps 113 and 114 by controlling the drive assembly and controlling the additional drive motor. The additional drive motor then applies a low additional driving torque, or if necessary no additional driving torque whatsoever. The pedaler can then pedal at a low rotational speed and with a high driving torque. The pedaler can still advance in a relatively rapid manner, by the electric auxiliary drive additively introducing a rotational speed thereto. The maximum for this rotational speed depends, of course, on the power of the electric auxiliary drive at the driving torque to be achieved.

Conversely, the pedaler may wish to pedal only with a very low driving torque but at a high rotational speed, using a small gear ratio so to speak. In this case, the electric auxiliary drive 24 only has to supply a low additional rotational speed or even no additional rotational speed whatsoever. It can even be provided that the electric auxiliary drive rotates in the direction counter to the direction in which the pedaler is pedaling, such that the pedaler has to pedal at an even higher rotational speed. An additional driving torque for moving the vehicle in the desired manner can then be supplied by means of the additional drive motor. All of this can be continuously adjusted by means of the control device 81 and the desired user settings. A mechanical gearing system is essentially no longer required.

In principle, this method can also be uninterruptedly continued for as long as the vehicle 80 is still being used.

What is claimed is:

1. A drive assembly for a manually driven vehicle, comprising an electric auxiliary drive, wherein the drive assembly comprises a first drive shaft for a manual drive and a rotor of the electric auxiliary drive, and wherein the first drive shaft and the rotor of the electric auxiliary drive are coupled to a common output element, wherein the first drive shaft and the rotor of the electric auxiliary drive are coupled to the output element by means of a strain wave gear, wherein the strain wave gear comprises an outer sleeve having an internal toothing system and a deformable inner sleeve having an external toothing system, and a wave generator, wherein the wave generator is at least indirectly connected to the rotor of the electric auxiliary drive for rotation therewith, wherein the deformable inner sleeve is at least indirectly connected to the first drive shaft for rotation therewith, and wherein the outer sleeve forms the output element, and wherein the first drive shaft comprises a first end and a second end which are opposite one another and on each of which a pedal can be arranged for rotation therewith.

2. The drive assembly according to claim 1, wherein the drive assembly comprises a second drive shaft which is designed as a hollow shaft and is connected to the rotor of the electric auxiliary drive for rotation therewith, and wherein the first drive shaft extends through the second drive shaft.

3. The drive assembly according to claim 2, wherein the second drive shaft comprises an end portion that has an elliptical cross section, the end portion forming the wave generator.

4. The drive assembly according to claim 2, wherein the second drive shaft comprises an end portion, and wherein a rolling bearing having an elliptical cross section is arranged between the end portion and the inner sleeve.

5. The drive assembly according to claim 1, wherein the output element is at least indirectly connected to a sprocket wheel for rotation therewith.

6. The drive assembly according to claim 1, wherein the outer sleeve is cylindrical and has an inner opening, and wherein the first drive shaft extends through the inner opening.

7. The drive assembly according to claim 1, wherein the outer sleeve comprises a first portion of a first diameter, on which the internal toothing system is arranged, and a second portion of a second diameter that is smaller than the first diameter, wherein the second portion extends through an opening in a first housing element.

8. The drive assembly according to claim 1, wherein the first drive shaft is supported in the outer sleeve by means of a first rolling bearing, the outer sleeve being supported in a housing of the drive assembly by means of at least one second rolling bearing.

9. The drive assembly according to claim 8, wherein the first rolling bearing and one rolling bearing of the at least one second rolling bearing are arranged so as to overlap at least in part in an axial direction with respect to a longitudinal axis of the first drive shaft.

10. A vehicle comprising a drive assembly having a first drive shaft for a manual drive and a rotor of the electric auxiliary drive, and wherein the first drive shaft and the rotor of the electric auxiliary drive are coupled to a common output element, wherein the first drive shaft and the rotor of the electric auxiliary drive are coupled to the output element by means of a strain wave gear, wherein the strain wave gear comprises an outer sleeve having an internal toothing system and a deformable inner sleeve having an external toothing system, and a wave generator, wherein the wave generator is at least indirectly connected to the rotor of the electric auxiliary drive for rotation therewith, wherein the deformable inner sleeve is at least indirectly connected to the first drive shaft for rotation therewith, and wherein the outer sleeve forms the output element, and wherein the first drive shaft comprises a first end and a second end which are opposite one another and on each of which a pedal can be arranged for rotation therewith, wherein a wheel or a rear wheel of the vehicle is driven by the drive assembly, the vehicle comprising a control device for controlling the electric auxiliary drive.

11. The vehicle according to claim 10, wherein the drive assembly is coupled to a wheel of the vehicle by means of a gearing system.

12. The vehicle according to claim 10, wherein the vehicle comprises a speed sensor for measuring a speed of the vehicle.

13. The vehicle according to claim 10, wherein the vehicle comprises, in addition to the drive assembly, an additional drive motor for driving a wheel or an additional wheel of the vehicle.

14. A method for controlling a drive assembly for a manually driven vehicle comprising an electric auxiliary drive, wherein the drive assembly comprises a first drive shaft for a manual drive and a rotor of the electric auxiliary drive, and wherein the first drive shaft and the rotor of the electric auxiliary drive are coupled to a common output element, wherein the first drive shaft and the rotor of the electric auxiliary drive are coupled to the output element by means of a strain wave gear, wherein the strain wave gear comprises an outer sleeve having an internal toothing system and a deformable inner sleeve having an external toothing system, and a wave generator, wherein the wave generator is at least indirectly connected to the rotor of the electric auxiliary drive for rotation therewith, wherein the deformable inner sleeve is at least indirectly connected to the first drive shaft for rotation therewith, and wherein the outer sleeve forms the output element, and wherein the first drive shaft comprises a first end and a second end which are opposite one another and on each of which a pedal can be arranged for rotation therewith, said method comprising the following steps: detecting a rotational speed of a first drive shaft for a manual drive, determining a desired rotational speed of the electric auxiliary drive dependent from the rotational speed of the first drive shaft, and controlling the rotational speed of the electric auxiliary drive, with the desired rotational speed of the electric auxiliary drive being the target setting, wherein the method additionally comprises the step of detecting a speed of the vehicle, the desired rotational speed also being determined dependent from the determined speed of the vehicle.

15. A method for controlling a drive assembly for a manually driven vehicle comprising an electric auxiliary drive, wherein the drive assembly comprises a first drive shaft for a manual drive and a rotor of the electric auxiliary drive, and wherein the first drive shaft and the rotor of the electric auxiliary drive are coupled to a common output element, wherein the first drive shaft and the rotor of the electric auxiliary drive are coupled to the output element by means of a strain wave gear, wherein the strain wave gear comprises an outer sleeve having an internal toothing system and a deformable inner sleeve having an external toothing system, and a wave generator, wherein the wave generator is at least indirectly connected to the rotor of the electric auxiliary drive for rotation therewith, wherein the deformable inner sleeve is at least indirectly connected to the first drive shaft for rotation therewith, and wherein the outer sleeve forms the output element, and wherein the first drive shaft comprises a first end and a second end which are opposite one another and on each of which a pedal can be arranged for rotation therewith, said method comprising the following steps: detecting a rotational speed of a first drive shaft for a manual drive, determining a desired rotational speed of the electric auxiliary drive dependent from the rotational speed of the first drive shaft, and controlling the rotational speed of the electric auxiliary drive, with the desired rotational speed of the electric auxiliary drive being a target setting, wherein the desired rotational speed is positive at at least one first rotational speed of the first drive shaft and negative at at least one second rotational speed of the first drive shaft.

16. The method according to claim 14, wherein a desired rotational speed is zero if a rotational speed of the first drive shaft is zero.

17. The method according to claim 15, wherein the desired rotational speed is specified as being linearly dependent on the rotational speed of the first drive shaft, at least when the rotational speed of the first drive shaft is in a range close to zero.

18. The method according to claim 17, wherein a coefficient of the linear dependency is adjustable.

19. A method for controlling a vehicle having a drive assembly having a first drive shaft for a manual drive and a rotor of the electric auxiliary drive, and wherein the first drive shaft and the rotor of the electric auxiliary drive are coupled to a common output element, wherein the first drive shaft and the rotor of the electric auxiliary drive are coupled to the output element by means of a strain wave gear, wherein the strain wave gear comprises an outer sleeve having an internal toothing system and a deformable inner sleeve having an external toothing system, and a wave generator, wherein the wave generator is at least indirectly connected to the rotor of the electric auxiliary drive for rotation therewith, wherein the deformable inner sleeve is at least indirectly connected to the first drive shaft for rotation therewith, and wherein the outer sleeve forms the output element, and wherein the first drive shaft comprises a first end and a second end which are opposite one another and on each of which a pedal can be arranged for rotation therewith, wherein a wheel or a rear wheel of the vehicle is driven by the drive assembly, the vehicle comprising a control device for controlling the electric auxiliary drive, wherein the vehicle comprises, in addition to the drive assembly, an additional drive motor for driving a wheel or an additional wheel of the vehicle, said method comprising the following steps: providing a desired rotational speed of the electric auxiliary drive and a desired driving torque of the additional drive motor, controlling the drive assembly, with the desired rotational speed of the electric auxiliary drive being the target setting, and controlling the additional drive motor, with the desired driving torque being the target setting.

* * * * *